United States Patent [19]

Suzuki

[11] Patent Number: 4,953,153
[45] Date of Patent: Aug. 28, 1990

[54] DATA REPRODUCING DEVICE CONTROLLING IMAGE DISPLAY DEPENDENT UPON LOSS OF TIME DATA

[75] Inventor: Masami Suzuki, Saitama, Japan

[73] Assignee: Pioneer Electronic Corporation, Tokyo, Japan

[21] Appl. No.: 242,444

[22] Filed: Sep. 9, 1988

[30] Foreign Application Priority Data

Mar. 16, 1988 [JP] Japan ................................ 63-060503

[51] Int. Cl.$^5$ ............................................. G11B 27/00
[52] U.S. Cl. ...................................... 369/49; 369/54; 358/343
[58] Field of Search .................... 369/48, 49, 50, 54, 369/59; 360/38.1, 33.1, 72.2, 27, 10.1, 10.3, 19.1; 358/341, 343

[56] References Cited

U.S. PATENT DOCUMENTS

| 4,340,916 | 7/1982 | Menezes | 360/72.2 |
| 4,446,488 | 5/1984 | Suzuki | 358/343 |
| 4,587,643 | 5/1986 | Monen et al. | 369/59 |
| 4,647,985 | 3/1987 | Yokosawa | 358/341 |

Primary Examiner—Donald McElheny, Jr.
Attorney, Agent, or Firm—Sughrue, Mion, Zinn, Macpeak & Seas

[57] ABSTRACT

A data reproducing device having a reading device for reading digitally recorded music data and image data from a data carrier, and data processing device for forming a music signal and an image signal according to the music data and image data thus read, and applying the music signal and image signal to a sound generating apparatus and display device, respectively, wherein the data processing device monitors time data recorded in the record carrier, and suspends, upon detection of the discontinuity of the time data, the image reproduction by the display device.

6 Claims, 5 Drawing Sheets

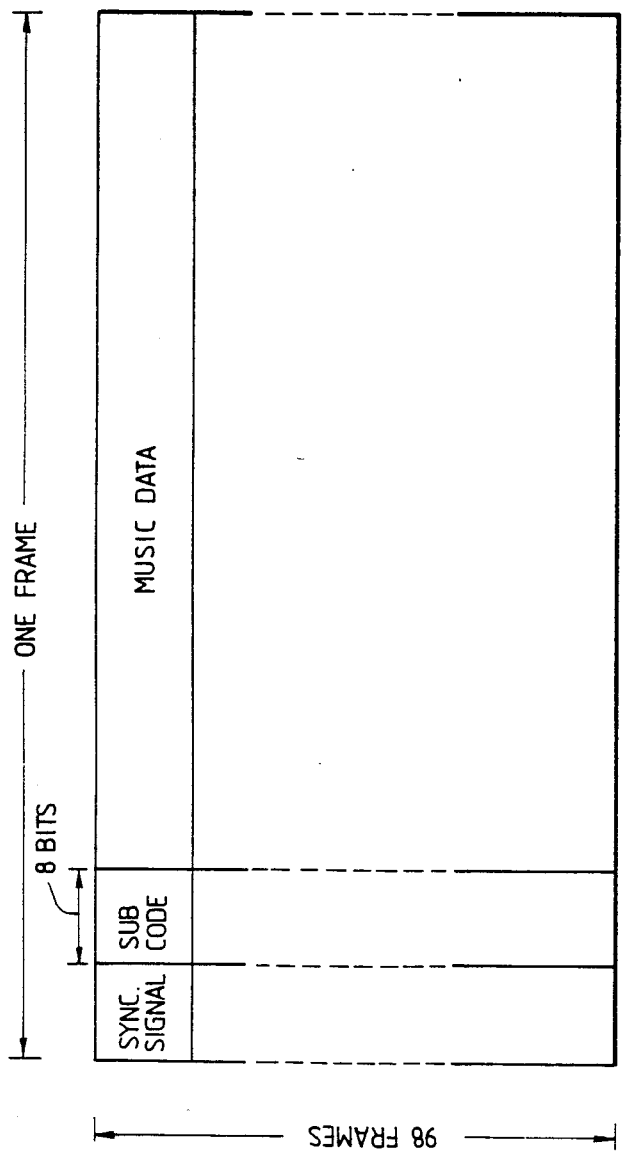

FIG. 4A PRIOR ART
FIG. 4B PRIOR ART
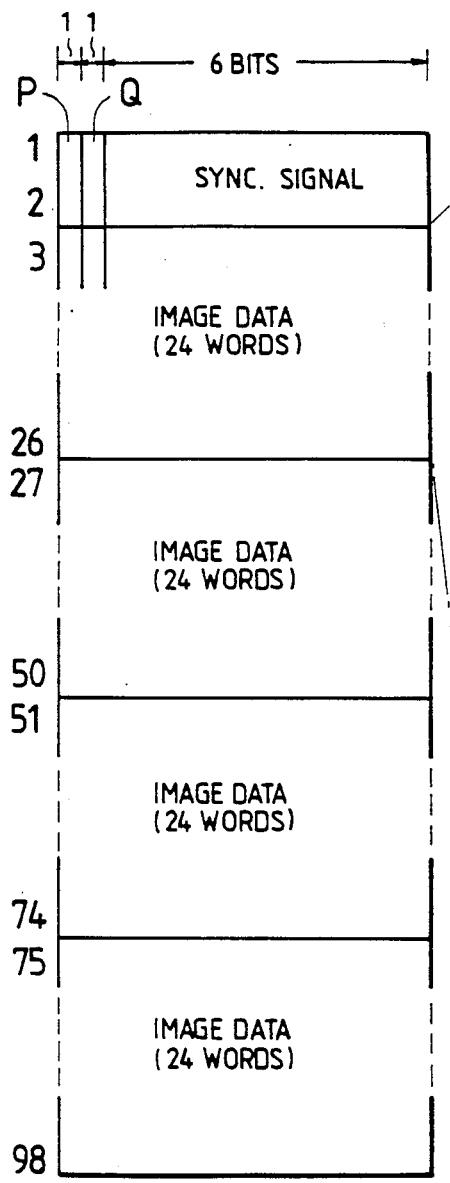
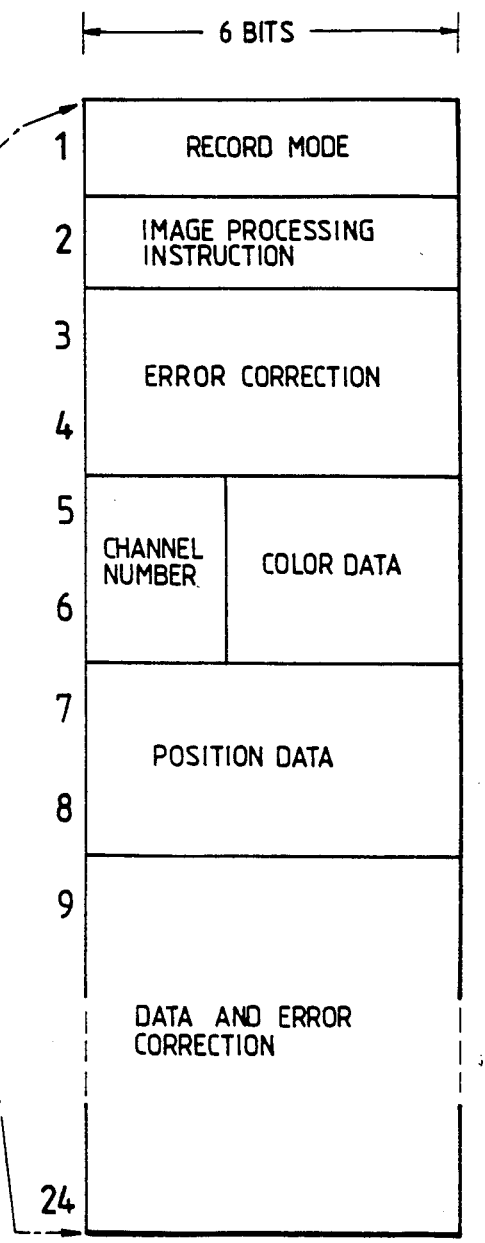

DATA REPRODUCING DEVICE CONTROLLING IMAGE DISPLAY DEPENDENT UPON LOSS OF TIME DATA

BACKGROUND OF THE INVENTION

1. Field of the Invention

This invention relates to a data reproducing device for reproducing music data and image data which are recorded on a data carrier.

2. Description of the Prior Art

As shown in the signal format illustrated in FIG. 3, in addition to music data, a series of digital data called "sub-codes" are recorded on a compact disc in which music data are recorded in the form of digital data. Each sub-code is made up of eight (8) bits. Of the eight bits, two higher-order bits correspond to a P signal and a Q signal, and the remaining six bits are used as image data. The sub-code is so determined that ninety-eight image words correspond to one frame of the sub-code. The P signal indicates the top of a piece of music, and it is raised to "1" at the top of the piece of music and held at "0" at the other positions. The Q signals are used to record a music number, data concerning the length of time for a piece of music (hereinafter referred to as "music time lapse data", when applicable), and data concerning the total time from the start (hereinafter referred to as "total time data", when applicable).

For the image data, ninety-eight words each consisting of six bits are provided as shown in FIG. 4(A). Of the ninety-eight words, the first and second are used as a synchronizing signal, and the remaining words are used as image data. The ninety-six words of image data are made up of four groups of unitary image data in which twenty-four words is a minimum unit.

In the unitary image data, as shown in FIG. 4(B), the record mode is recorded in the first word an image processing instruction is recorded in the second word, and error correction signs for the first and second words are recorded in the third and fourth words.

As for the record mode, a line graphics mode and a TV graphics mode are provided. As for the image processing instruction, an instruction for covering a screen with a color, an instruction for applying two different colors to a screen forming units (fonts) to draw a figure, an instruction for moving an entire screen vertically or horizontally, and so forth are available.

A channel number and color data for specifying picture color are recorded in the fifth and sixth words. Position data for indicating a data display position in the picture are recorded in the seventh and eight words, and data and error correction signs are recorded in the last sixteen words (i.e., the ninth through twenty-fourth words).

FIG. 5 is a block diagram showing a conventional data reproducing device for playing a disc in which music data and image data including sub-codes have been recorded.

The data reproducing device, as shown in FIG. 5, comprises; a player 1; a sound generating unit 2 including an amplifier and a loudspeaker: a display unit 3; and a data processing unit 4. The player 1 reads music data, sub-codes, etc. from the disc D to apply a reproduction signal to the data processing unit 4. The unit 4 extracts the music data and image data from the output reproduction signal of the player 1, to control the sound generating unit 2 and the display unit 3.

The output reproduction signal of the player 5 is first applied to a decoder 5 in the data processing unit 4, where it is subjected to deinterleaving and error correction, and the music data is applied through a processing circuit (not shown) to the sound generating unit 2 while the image data is applied to an instruction discriminating circuit 6. The instruction discriminating circuit 6 determines whether or not an image processing instruction is recorded in the second word (FIG. 4(B)) of the sub-code and outputs a detection signal when an image processing instruction is present. An instruction analyzing circuit 7 operates to analyze an image processing instruction, to thereby provide data which specify the colors of the picture elements of the picture according to the image data recorded in the sub-code. In response to the output data of the instruction analyzing circuit 7 and the output detection signal of the instruction discriminating circuit 6, a display control circuit 8 forms video signals including color signals and synchronizing signals, so that the image data is displayed on the display unit 3.

In the case where, with the conventional data reproducing device, the music data recorded in the disc D is manually searched with the player 1 by fast forwarding or fast reversing, the player 1 performs a sequential operation where data at discontinuous parts of the disc D are reproduced sequentially. As for the music data, even when sound reproduction is made with data obtained from separate parts of the disc, we hear it naturally. On the other hand, the image data recorded in the sub-code is a sequential data train. Therefore, if a discontinuous reproduction is produced, for instance, by manual search, the continuity of the image data is lost. As a result, the displayed picture is missing parts over the entire screen, suffers from double writing, or is abnormal in coloration. That is, the reproduction is unsatisfactory. Thus, the conventional data reproducing device is unreliable, and the user may find the resultant picture disagreeable.

SUMMARY OF THE INVENTION

Accordingly, an object of this invention is to provide a data reproducing device in which the reproduced picture is free from the defects which otherwise may occur with the discontinuous reproduction of image data, whereby the user can observe the resultant picture at ease.

According to the present invention a data reproducing device is provided which, as shown in FIG. 1, comprises: reading means 1 for reading digitally recorded music data and image data from a data carrier D and data processing means 4 for forming a music signal and an image signal according to the music data and image data thus read, and applying the music signal and image signal to a sound generating means 2 and display means 3, respectively, wherein the data processing means 4 monitors time data recorded in the record carrier D, and suspends the image reproduction by the display means upon detection of a discontinuity of the time data.

The music data and image data recorded in the carrier D are read out by the reading means 1 and then are applied to the data processing means 4. The data processing means 4 produces the music signal and the image signal according to the music data and image data thus read out. The music signal and the image signal are applied to the sound generating means 2 and the display means 3, respectively.

The data processing means 4 monitors the time data which represents the lapse of time in the performance of a piece of music recorded in the data carrier D. Upon detection of a discontinuous change of the time data, the data processing means 4 determines therefrom that a manual search (discontinuous reproduction), such as a quick forwarding operation or quick reversing operation, has been carried out, and causes the display means 3 to suspend the image reproduction, thereby pliminating the irregularities which otherwise may occur with the reproduced image in the discontinuous reproduction.

BRIEF DESCRIPTION OF THE DRAWINGS

FIG. 3 is an explanatory diagram showing a format for signals recorded in a compact disc.

FIG. 4A and 4B is an explanatory diagram sowing a sub-code format.

DETAILED DESCRIPTION OF PREFERRED EMBODIMENT

Figure 1:
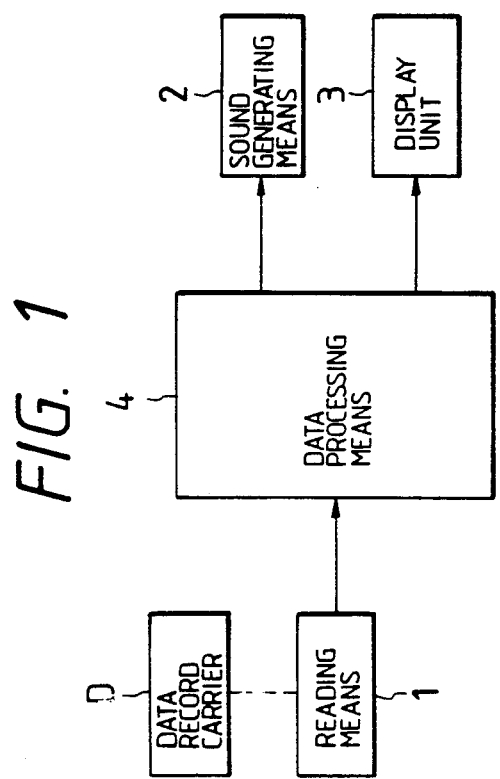
FIG. 1 is a block diagram for a description of the principle of a data reproducing device according to this invention.
Figure 2:
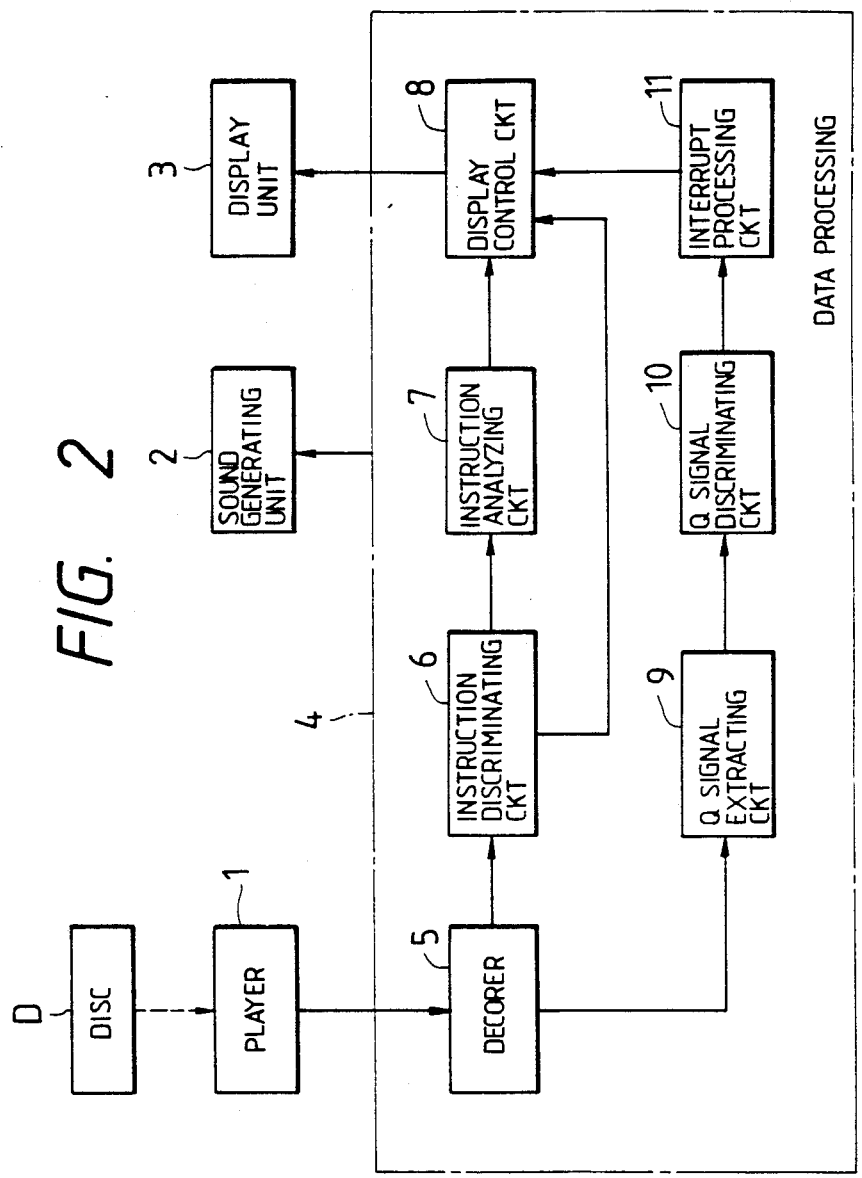
FIG. 2 is a block diagram showing one example of the data reproducing device according to the invention.
Figure 5:
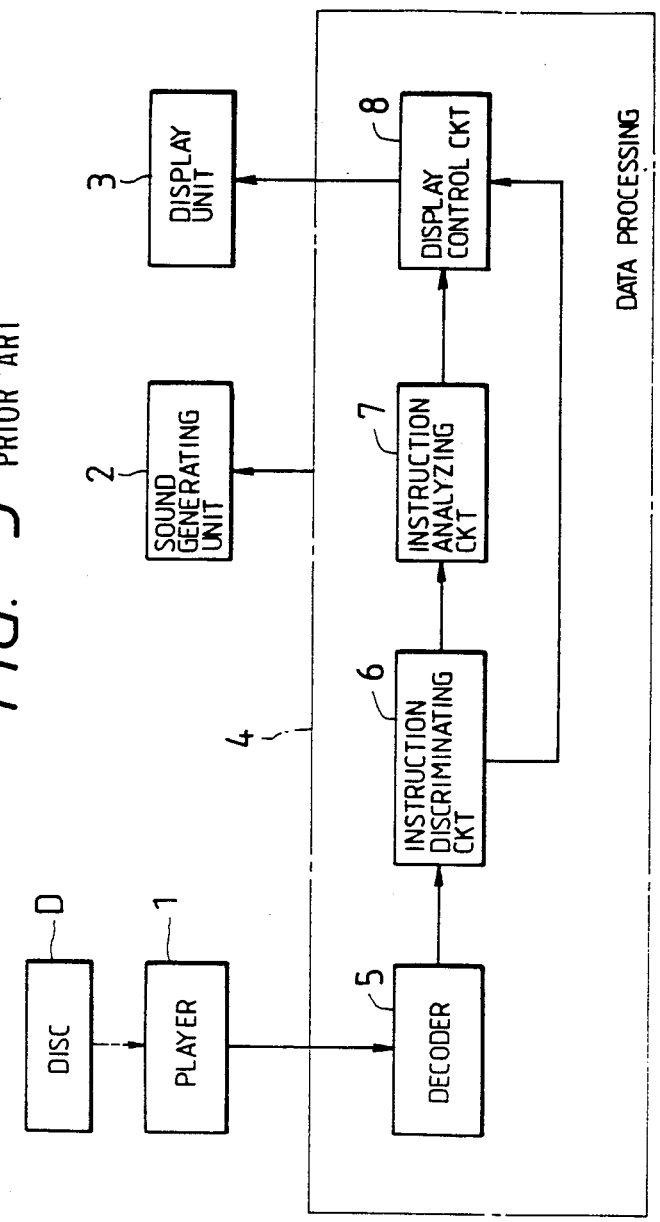
FIG. 5 is a block diagram showing a conventional data reproducing device.

FIG. 2 is a block diagram showing one example of a data reproducing device according to this invention. In FIG. 2, those components which have been previously described with reference to FIG. 5 are therefore designated by the same reference numerals or characters.

In the device of FIG. 2, a disc player 2 reads music data and sub-codes from a disc D and applies them to a data processing circuit 4. The data processing circuit 4 extracts image data from the sub-code thus read, so that an image is displayed on a display unit 3.

The data processing circuit 4 comprises a series circuit which includes a decoder 5 to which the output reproduction signal of the player 1 is applied, an instruction discriminating circuit 6, an instruction analyzing circuit 7, and a display control circuit 8. The output of the circuit 8 is supplied to the display unit 3. The data processing circuit 4 further comprises a series circuit of a Q signal extracting circuit 9 to which the output signal of the decoder 5 is applied, a Q signal discriminating circuit 10, and an interrupt processing circuit 11. The interrupt processing circuit 11 is designed to issue an interrupt instruction to the display control circuit 8.

In the data reproducing device thus organized, the music data and sub-code data read by the player 1 are applied to the decoder 5, where they are subjected to deinterleaving and error correction. As a result, the music data is applied through a processing circuit (not shown) to a sound generating unit, 2 such as a loudspeaker system. From the sub-code data, the image data is supplied to the instruction discriminating circuit 6 to determine whether or not the image processing instruction is recorded in the second word of each unitary image data. If an image processing instruction is recorded, the circuit 6 applies a detection signal to the instruction analyzing circuit 7. In response to the detection signal, the instruction analyzing circuit 7 forms image data. The display control circuit 8 forms a video signal according to the image data thus formed, so that a picture is displayed on the display unit 3.

The decoder 5 operates to extract the Q signal from the sub-code and outputs the same. The Q signal, as was described before, is one bit of the sub-code which consists of eight (8) bits per image word, and the unitary data consists of ninety-eight (98) frames (corresponding to one frame of the sub-code). The Q signal covers a 2-bit synchronizing signal, 4-bit control code, 4-bit address code, 72-bit data, and 16-bit error detecting code; i.e., ninety-eight (98) bits in total. The 72-bit data includes time data such as the above-described total time data and music time lapse data.

The Q signal extracting circuit 9 decodes the time data from the Q signal and applies it to the Q signal discriminating circuit 10. The Q signal discriminating circuit 10 determines whether or not the time data increases or decreases regularly. During ordinary reproduction, the time data will increase with a predetermined regularity for every frame of the sub-code, however, the regularity is affected by fast-forwarding and fast-rewinding operations. The Q signal discriminating circuit 10 detects this condition to apply the detection signal to the interrupt processing circuit 11, whereupon the interrupt processing circuit 11 suspends the image display carried out under the control of the display control circuit 8, and erases the displayed picture. Sometimes the Q signal discriminating circuit 10 cannot reproduce the time data because of scratches or the like on the disc D. Therefore, the resulting discontinuity in the time data is detected utilizing a certain width, to perform the picture erase control.

When during the reproduction of the music data and image data from the carrier, discontinuous reproduction is performed, for instance, by the manual search, according to the invention the discontinuity in the time data indicating the music performance time is detected to thereby detect the discontinuous reproduction whereby the displayed picture is erased. Therefore, with the data reproducing device of the invention, the picture can be erased before it is affected by the manual search. Thus, the data reproducing device of the invention is reliable at all times.

What is claimed is:

1. A data reproducing device comprising;
   reading means for reading digitally recorded music data and image data from a data carrier; and
   data processing means for producing a music signal and an image signal according to said music data and image data and applying said music signal and image signal to sound generating means and display means, respectively,
   said data processing means monitoring time data recorded in said data carrier, and suspending reproduction of said image signal on said display means upon the detection of a discontinuity in said time data.

2. A data reproducing device as claimed in claim 1, wherein said data carrier has a sub-code disposed therein, said sub-code data including a P signal indicating the beginning of a piece of music and a Q signal indicating music time data.

3. A data reproducing device as claimed in claim 2, wherein said data processing circuit comprises;
   decoder means receiving said music data and said sub-code data from said reading means, and subjecting said music data and said sub-code data to deinterleaving and error correction;
   instruction discriminating means receiving said sub-code data from said decoder means, for determining if said sub-code data includes an image processing instruction, and outputting a detection signal when an image processing instruction is included in said sub-code data;

instruction analyzing means receiving said detection signal and producing said image data in response thereto;

display control means receiving said image data from said instruction analyzing means and in response producing a video signal which is applied to said display means;

Q signal extracting means receiving said sub-code data from said decoder means and decoding said time data from said Q signal;

Q signal discriminating means receiving said time data from said Q signal extracting means and determining whether changes in said time data occur on a regular basis; and interrupt processing means for suspending operation of said display control means to prevent image display on said display means when said time data does not change regularly.

4. A data reproducing device as claimed in claim 3, wherein a regular change in said time data is one of a regular increase and a regular decrease.

5. A data reproducing device as claimed in claim 4, wherein said data carrier is a compact disc.

6. A data reproducing device as claimed in claim 1, wherein said data carrier is a compact disc.

* * * * *